US012525389B2

(12) United States Patent
Kawaguchi et al.

(10) Patent No.: US 12,525,389 B2
(45) Date of Patent: Jan. 13, 2026

(54) COIL COMPONENT AND MANUFACTURING METHOD THEREFOR

(71) Applicant: TDK Corporation, Tokyo (JP)

(72) Inventors: Yuuichi Kawaguchi, Tokyo (JP); Tomonaga Nishikawa, Tokyo (JP); Takuya Takeuchi, Tokyo (JP); Mitsuo Natori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 755 days.

(21) Appl. No.: 17/798,496

(22) PCT Filed: Feb. 10, 2021

(86) PCT No.: PCT/JP2021/004965

§ 371 (c)(1),
(2) Date: Aug. 9, 2022

(87) PCT Pub. No.: WO2021/166763

PCT Pub. Date: Aug. 26, 2021

(65) Prior Publication Data

US 2023/0071379 A1 Mar. 9, 2023

(30) Foreign Application Priority Data

Feb. 17, 2020 (JP) ................................ 2020-024126

(51) Int. Cl.
*H01F 5/00* (2006.01)
*H01F 17/04* (2006.01)
(Continued)

(52) U.S. Cl.
CPC ............. *H01F 27/32* (2013.01); *H01F 17/04* (2013.01); *H01F 41/04* (2013.01)

(58) Field of Classification Search
CPC ....................................................... H01F 27/32
(Continued)

(56) References Cited

U.S. PATENT DOCUMENTS 5,349,743 A * 9/1994 Grader .................... H01F 41/16 336/200
6,459,351 B1 * 10/2002 Maki .................. H01F 27/2804 336/200
(Continued)

FOREIGN PATENT DOCUMENTS

JP 2007-067214 A 3/2007
JP 2019-140202 A 8/2019
JP 2020-013854 A 1/2020

OTHER PUBLICATIONS

International Search Report issued in corresponding International Patent Application No. PCT/JP2021/004965, dated Mar. 30, 2021, with English translation.

*Primary Examiner* — Ronald Hinson
(74) *Attorney, Agent, or Firm* — Rimon P.C.

(57) ABSTRACT

To achieve a high inductance value while reducing the entire thickness in a coil component having a structure in which spiral coil patterns are stacked. A coil component includes: a coil part having a structure in which interlayer insulating films and spirally wound coil patterns are alternately stacked in the axial direction of the coil component; and magnetic element members embedding therein the coil part. The interlayer insulating film covering, from one end side in the axial direction, one coil pattern positioned at the one end in the axial direction is higher in permeability than the interlayer insulating films. Thus, the one coil pattern positioned at the end portion is covered with the interlayer insulating film having a high permeability, so that it is possible to achieve a high inductance value while reducing the entire thickness.

7 Claims, 12 Drawing Sheets

1

(51) Int. Cl.
*H01F 27/32* (2006.01)
*H01F 41/04* (2006.01)

(58) Field of Classification Search
USPC .................................................. 336/200, 221
See application file for complete search history.

(56) References Cited

U.S. PATENT DOCUMENTS

| | | | | |
|---|---|---|---|---|
| 6,515,568 | B1 * | 2/2003 | Maki | H01F 3/10 336/200 |
| 10,453,602 | B2 * | 10/2019 | Yoshioka | H01F 27/2823 |
| 11,056,275 | B2 * | 7/2021 | Kwon | H01F 27/24 |
| 11,424,065 | B2 * | 8/2022 | Yoon | H01F 17/04 |
| 11,776,734 | B2 * | 10/2023 | Sato | H01F 27/29 336/200 |
| 2013/0069752 | A1 * | 3/2013 | Kim | H01F 17/0033 336/200 |
| 2013/0222101 | A1 * | 8/2013 | Ito | H01F 3/08 336/83 |
| 2017/0140866 | A1 * | 5/2017 | Hong | H01F 41/10 |
| 2017/0200554 | A1 * | 7/2017 | Kudo | H01F 27/36 |
| 2018/0122556 | A1 * | 5/2018 | Kim | H01F 41/041 |
| 2020/0027646 | A1 | 1/2020 | Hamada et al. | |

* cited by examiner

COIL COMPONENT AND MANUFACTURING METHOD THEREFOR

CROSS REFERENCE TO RELATED APPLICATIONS

This application is the U.S. National Phase under 35 U.S.C. § 371 of International Application No. PCT/JP2021/004965, filed on Feb. 10, 2021, which claims the benefit of Japanese Patent Application No. 2020-024126, filed on Feb. 17, 2020, the entire contents of each are hereby incorporated by reference.

TECHNICAL FIELD

The present invention relates to a coil component and a manufacturing method therefor and, more particularly, to a coil component having a structure in which spiral coil patterns are stacked one on another and a manufacturing method for such a coil component.

BACKGROUND ART

As a coil component having a structure in which spiral coil patterns are stacked, a coil component described in Patent Document 1 is known. The coil component described in Patent Document 1 has a structure in which a coil pattern is embedded in a first magnetic resin layer containing spherical magnetic filler, and the coil pattern is sandwiched in the stacking direction by second magnetic resin layers containing flat magnetic filer.

The coil component described in Patent Document 1 has a structure in which the coil pattern is embedded in the magnetic resin layer as described above and thus can achieve a high inductance value.

CITATION LIST

Patent Document

[Patent Document 1] JP 2019-140202A

SUMMARY OF THE INVENTION

Problem to be Solved by the Invention

However, in Patent Document 1, the second magnetic rein layers are disposed outside the first magnetic resin layer, which disadvantageously increases the thickness of the entire coil component.

It is therefore an object of the present invention to achieve a high inductance value while reducing the entire thickness in a coil component having a structure in which spiral coil patterns are stacked and a manufacturing method therefor.

Means for Solving the Problem

A coil component according to the present invention includes: a coil part having a structure in which a plurality of interlayer insulating films and a plurality of spirally wound coil patterns are alternately stacked in the axial direction; and a magnetic element member embedding therein the coil part. The plurality of interlayer insulating films include a first interlayer insulating film covering, from one end side in the axial direction, a first coil pattern of the plurality of coil patterns that is positioned at the one end in the axial direction and second interlayer insulating films covering the remaining coil patterns of the plurality of coil patterns. The first interlayer insulating film is higher in permeability than the second interlayer insulating films.

According to the present invention, the first coil pattern positioned at the end portion is covered with the first interlayer insulating film having a high permeability, so that it is possible to achieve a high inductance value while reducing the entire thickness.

In the present embodiment, the magnetic element member may be higher in permeability than the first interlayer insulating film. This can achieve a higher inductance value. Further, when a material having a thermal expansion coefficient close to that of the magnetic element member is used for the first interlayer insulating film, it is possible to prevent peeling at the interface between the first interlayer insulating film and the magnetic element member.

In the present invention, the first interlayer insulating film may be made of the same material as the magnetic element member. This makes the thermal expansion coefficient of the first interlayer insulating film and that of the magnetic element member coincide with each other, thereby making it possible to prevent peeling at the interface between the first interlayer insulating film and the magnetic element member more effectively.

In the present invention, the first interlayer insulating film may be made of a magnetic resin material obtained by adding magnetic filler to a resin material, and the maximum particle size of the magnetic filler may be smaller than the pattern interval of the first coil pattern. This allows the magnetic filler to enter between the patterns of the first coil pattern, making it possible to achieve a higher inductance value.

In the present invention, the magnetic filler may contain nanofiller made of a magnetic metal member having a mean particle size of 1 μm or less. This allows the magnetic filler to enter between the patterns of the first coil pattern more easily.

In the present invention, the first coil pattern may be tapered such that a cross section of the first coil pattern is narrower toward the one end side in the axial direction. This allows the magnetic filler to enter between the patterns of the first coil pattern more easily.

In the present invention, the coil part may include an electrode pattern positioned in the same conductor layer as the first coil pattern, and the electrode pattern may contact the first interlayer insulating film and may be exposed from the magnetic element member. This enhances heat dissipation performance of the coil component.

In the present invention, the plurality of interlayer insulating films may further include a third interlayer insulating film covering, from the other end side in the axial direction, a second coil pattern of the plurality of coil patterns that are positioned at the other end in the axial direction, and the third interlayer insulating film may be higher in permeability than the second interlayer insulating film. Thus, the third coil pattern positioned at the end portion is covered with the third interlayer insulating film having a high permeability, so that it is possible to achieve a high inductance value while reducing the entire thickness.

A coil component manufacturing method according to the present invention includes: a first step of alternately stacking a plurality of interlayer insulating films and a plurality of spirally wound coil patterns in the axial direction to form a coil part; and a second step of embedding the coil part in a magnetic element member. The plurality of coil patterns includes a first coil pattern to be formed last and remaining second coil patterns. The plurality of interlayer insulating films include first and second interlayer insulating films. The first step includes a step of alternately forming the second coil patterns and the second interlayer insulating films and a step of, after forming the first coil pattern, covering the first coil pattern with the first interlayer insulating film. The first interlayer insulating film is higher in permeability than the second interlayer insulating film.

According to the present invention, the first coil pattern positioned at the end portion is covered with the first interlayer insulating film having a high permeability, thereby making it possible to manufacture a coil component having a small thickness as a whole and a high inductance value.

Advantageous Effects of the Invention

As described above, according to the present invention, it is possible to achieve a high inductance value while reducing the entire thickness in a coil component having a structure in which spiral coil patterns are stacked and a manufacturing method therefor.

MODE FOR CARRYING OUT THE INVENTION

Hereinafter, preferred embodiments of the present invention will be described in detail with reference to the accompanying drawings.

Figure 1:
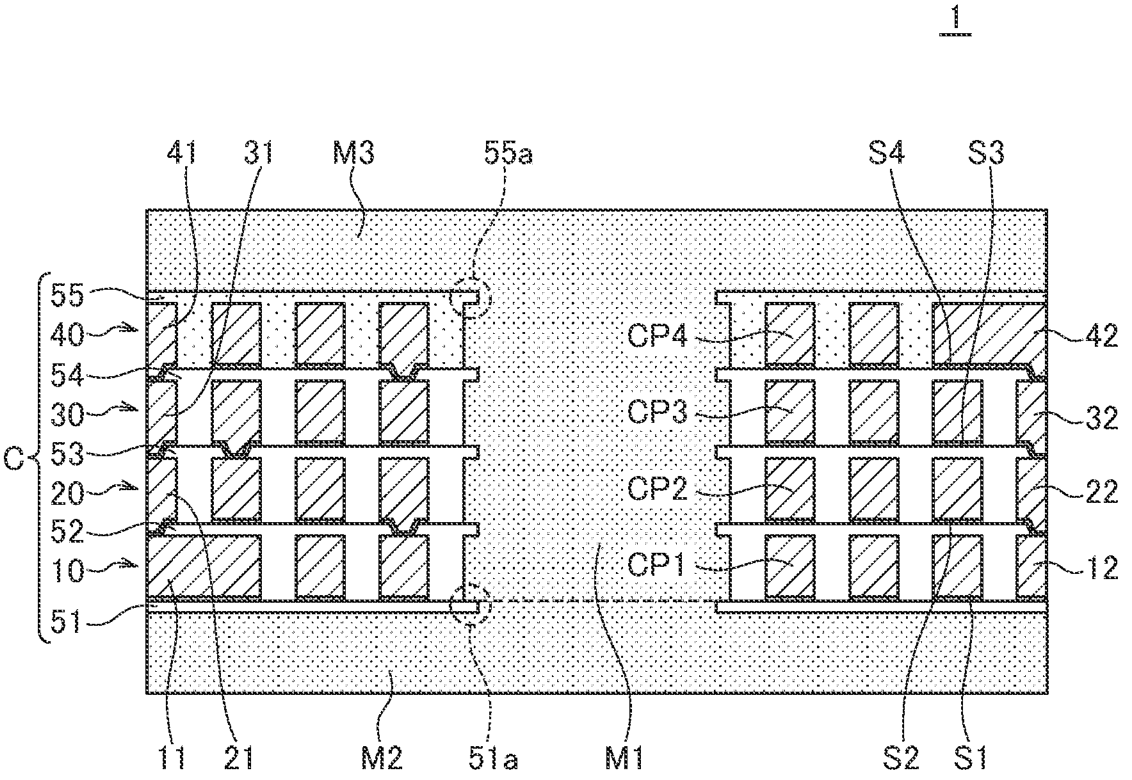
FIG. 1 is a schematic cross-sectional view for explaining the structure of a coil component 1 according to an embodiment of the present invention.

FIG. 1 is a schematic cross-sectional view for explaining the structure of a coil component 1 according to an embodiment of the present invention.

The coil component 1 according to the embodiment of the present invention is a surface-mount type chip component suitably used as an inductor for a power supply circuit and has, as illustrated in FIG. 1, a magnetic element members M1 to M3 and a coil part C embedded in the magnetic element members M1 to M3. Although the configuration of the coil part C will be described later, in the present embodiment, four conductor layers each having a spiral coil pattern are stacked through interlayer insulating films to form one coil conductor.

The magnetic element members M1 to M3 are each a composite member containing magnetic metal filler made of iron (Fe) or a permalloy-based material and a resin binder and form a magnetic path of magnetic flux generated by a current flowing in the coil part C. The resin binder is preferably epoxy resin in the form of liquid or powder. The magnetic element members M1 to M3 may be made of the same material or mutually different materials. The magnetic element member M1 is a part filled in the inner diameter area of the coil part C, the magnetic element member M2 is a part covering the coil part C from one side (lower side in FIG. 1) in the axial direction of the coil part C, and the magnetic element member M3 is a part covering the coil part C from the other side (upper side in FIG. 1) in the axial direction.

As illustrated in FIG. 1, the coil part C has alternately stacked interlayer insulating films 51 to 55 and conductor layers 10, 20, 30, and 40. The conductor layers 10, 20, 30, and 40 have spiral coil patterns CP1 to CP4, respectively, and the upper or lower surfaces of the coil patterns CP1 to CP4 are covered with the interlayer insulating films 51 to 55. The side surfaces of the coil patterns CP1 to CP4 are covered respectively with the interlayer insulating films 52 to 55. The above-mentioned upper and lower surfaces of the coil patterns CP1 to CP4 each refer to surfaces perpendicular to the coil axis, and the side surfaces of the coil patterns CP1 to CP4 each refers to a surface parallel to the coil axis.

The coil patterns CP1 to CP4 are mutually connected through through holes formed in the interlayer insulating films 52 to 54 to constitute a single coil part conductor. The conductor layers 10, 20, 30, and 40 are preferably made of copper (Cu). In the present invention, out of the interlayer insulating films 51 to 55, the interlayer insulating films 51 to 54 are made of a non-magnetic material, and the interlayer insulating film 55 in the uppermost layer is made of a magnetic material. That is, the interlayer insulating film 55 is higher in permeability than the interlayer insulating films

51 to 54. The interlayer insulating film 51 in the lowermost layer may be made of the same magnetic material as the interlayer insulating film 55.

The conductor layer 10 is the first conductor layer formed on the upper surface of the magnetic element member M2 through the interlayer insulating film 51 and includes an underlying seed layer S1. The conductor layer 10 has the coil pattern CP1 spirally wound in a plurality of turns and two electrode patterns 11 and 12. The lower surface of the coil pattern CP1 is covered with the interlayer insulating film 51, and the side and upper surfaces thereof are covered with the interlayer insulating film 52. As illustrated in FIG. 1, in a predetermined cross section, the coil pattern CP1 and electrode pattern 11 are connected, whereas the electrode pattern 12 is provided independently of the coil pattern CP1. The electrode patterns 11 and 12 are exposed from the magnetic element members M1 to M3.

The conductor layer 20 is the second conductor layer formed on the upper surface of the conductor layer 10 through the interlayer insulating film 52 and includes an underlying seed layer S2. The conductor layer 20 has the coil pattern CP2 spirally wound in a plurality of turns and two electrode patterns 21 and 22. The lower surface of the coil pattern CP2 is covered with the interlayer insulating film 52, and the side and upper surfaces thereof are covered with the interlayer insulating film 53. Both electrode patterns 21 and 22 are provided independently of the coil pattern CP2. The electrode patterns 21 and 22 are exposed from the magnetic element members M1 to M3.

The conductor layer 30 is the third conductor layer formed on the upper surface of the conductor layer 20 through the interlayer insulating film 53 and includes an underlying seed layer S3. The conductor layer 30 has the coil pattern CP3 spirally wound in a plurality of turns and two electrode patterns 31 and 32. The lower surface of the coil pattern CP3 is covered with the interlayer insulating film 53, and the side and upper surfaces thereof are covered with the interlayer insulating film 54. Both electrode patterns 31 and 32 are provided independently of the coil pattern CP3. The electrode patterns 31 and 32 are exposed from the magnetic element members M1 to M3.

The conductor layer 40 is the fourth conductor layer formed on the upper surface of the conductor layer 30 through the interlayer insulating film 54 and includes an underlying seed layer S4. The conductor layer 40 has the coil pattern CP4 spirally wound in a plurality of turns and two electrode patterns 41 and 42. The lower surface of the coil pattern CP4 is covered with the interlayer insulating film 54, and the side and upper surfaces thereof are covered with the interlayer insulating film 55. As illustrated in FIG. 1, in a predetermined cross section, the coil pattern CP4 and electrode pattern 42 are connected, whereas the electrode pattern 41 is provided independently of the coil pattern CP4. The electrode patterns 41 and 42 are exposed from the magnetic element members M1 to M3.

The inner peripheral end of the coil pattern CP1 and the inner peripheral end of the coil pattern CP2 are connected through a via conductor constituting a part of the conductor layer 20 and penetrating the interlayer insulating film 52. The outer peripheral end of the coil pattern CP2 and the outer peripheral end of the coil pattern CP3 are connected through a via conductor constituting a part of the conductor layer 30 and penetrating the interlayer insulating film 53. The inner peripheral end of the coil pattern CP3 and the inner peripheral end of the coil pattern CP4 are connected through a via conductor constituting a part of the conductor layer 40 and penetrating the interlayer insulating film 54. As a result, the coil patterns CP1 to CP4 are connected in series to form a coil conductor having a plurality of turns. The electrode patterns 11, 21, 31, and 41 are used as one external terminal, and the electrode patterns 12, 22, 32, and 42 are used as the other external terminal.

The structure of the coil component 1 according to the present embodiment has been described above. Thus, in the coil component 1 according to the present embodiment, the coil part C is embedded in the magnetic element members M1 to M3, so that a high inductance value can be obtained with the magnetic element members M1 to M3 serving as a magnetic path. Further, the interlayer insulating film 55 covering the coil pattern CP4 in the uppermost layer is made of a magnetic material, so that it is possible to further increase an inductance value without additionally providing another magnetic layer. In particular, when the interlayer insulating film 55 has a protruding part 55*a* protruding to the inner diameter area of the coil pattern, the protruding part 55*a* serves as a magnetic resistance to reduce the inductance value; however, in the coil component 1 according to the present embodiment, since the interlayer insulating film 55 is made of a magnetic material, even if the interlayer insulating film 55 has the protruding part 55*a*, such a reduction in inductance value can be suppressed. Further, when the interlayer insulating film 51 in the lowermost layer is made of the same material as the interlayer insulating film 55, such a reduction in inductance value due to the presence of the protruding part 51*a* can be suppressed.

The interlayer insulating film 55 may be a magnetic resin material obtained by adding magnetic filler to a resin material. This allows magnetic characteristics and insulation to be controlled by the type, adding amount, particle size, or the like of the magnetic filler. In order to enhance the magnetic characteristics of the interlayer insulating film 55, magnetic metal filler made of iron (Fe) or a permalloy-based material can be added as with the magnetic element members M1 to M3; however, the interlayer insulating film 55 directly contacts the coil pattern CP4 and thus needs to have higher insulation than the magnetic element members M1 to M3. In order to enhance the insulation of the interlayer insulating film 55, the amount of the magnetic filler to be added to a resin material is made smaller than the amount of the magnetic filler contained in the magnetic element members M1 to M3, or the particle size of the magnetic filler to be added to a resin material is made smaller than the particle size of the magnetic filler contained in the magnetic element members M1 to M3. In this case, the permeability of the interlayer insulating film 55 becomes lower than that of the magnetic element members M1 to M3 but is higher than that of a common resin material using a nonmagnetic material, thus making it possible to increase the inductance value. Further, the interlayer insulating film 55 may be made of the same material as the magnetic element members M1 to M3 as long as the insulation is maintained.

Further, the interlayer insulating film 55 is made of a material of the same type as the magnetic element members M1 and M3, so that the difference of thermal expansion coefficients can be reduced. This can prevent peeling at the interface between the interlayer insulating film 55 and the magnetic element members M1 and M3. In particular, when the interlayer insulating film 55 and magnetic element members M1 and M3 are made of the same material, their thermal expansion coefficients completely coincide with each other, so that peeling at the interface therebetween is much less likely to occur.

The maximum particle size of the magnetic filler contained in the interlayer insulating film 55 is preferably smaller than the pattern interval of the coil pattern CP4. This allows the magnetic filler to enter between the patterns of the coil pattern CP4, thereby making it possible to achieve a higher inductance value. In particular, when nanofiller made of a magnetic metal body having a mean particle size of 1 μm or less is used, the nanofiller easily enters between the patterns of the coil pattern CP4.

Figure 2:
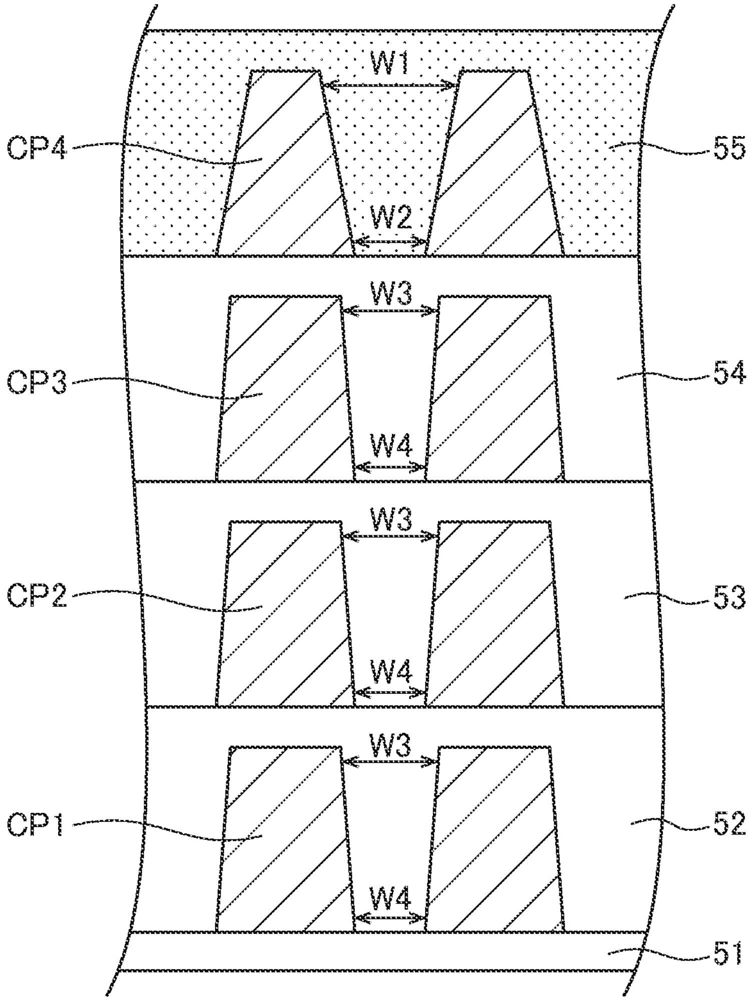
FIG. 2 is a partial cross-sectional view of the coil part C.

In order to allow the magnetic filler to easily enter between the patterns of the coil pattern CP4, the coil pattern CP4 may be formed into a tapered shape in cross section as illustrated in FIG. 2 which is a partly cross-sectional view. That is, assuming that the pattern interval at the bottom contacting the interlayer insulating film 54 is W2 and that the pattern interval at the upper portion opposite the bottom is W1, the coil pattern CP4 may be tapered in cross section from the bottom to the upper portion so as to satisfy W1>W2. The coil patterns CP1 to CP3 may also have a tapered shape. That is, assuming that the pattern interval at the bottom of each of the coil patterns CP1 to CP3 is W4 and that the pattern interval at the upper portion of each of the coil patterns CP1 to CP3 is W3, W3>W4 may be satisfied. In this case, when the coil pattern CP4 is tapered more significantly, that is, when (W1−W2)>(W3−W4), it is possible to allow the magnetic filler to easily enter between the patterns of the coil pattern CP4 while ensuring a sufficient sectional area for the coil patterns CP1 to CP3.

The following describes a manufacturing method for the coil component 1 according to the present embodiment.

FIGS. 3 to 27 are process views for explaining the manufacturing method for the coil component 1 according to the present embodiment. Although the process views illustrated in FIGS. 3 to 27 each illustrate a cross section corresponding to a single coil component 1, multiple coil components 1 can be produced, in practice, by fabricating individual coil components 1 at a time using an aggregate substrate.

Figure 3:
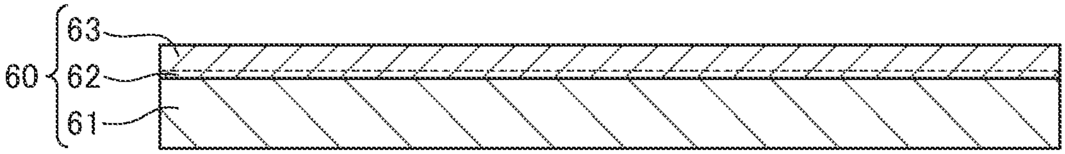
FIG. 3 is a process view for explaining the manufacturing method for the coil component 1.
Figure 4:
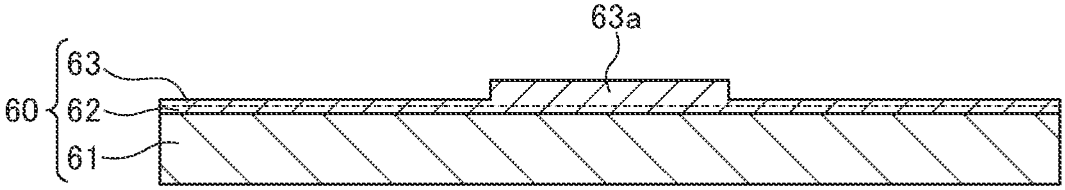
FIG. 4 is a process view for explaining the manufacturing method for the coil component 1.

A support 60 having a structure in which metal foils 62 and 63 such as copper (Cu) foils are provided on the surface of a base 61 is prepared (FIG. 3). A peeling layer is provided at the interface between the metal foils 62 and 63. Then, the metal foil 63 is patterned to form a protruding part 63*a* protruding from the metal foil 63 (FIG. 4).

Figure 5:
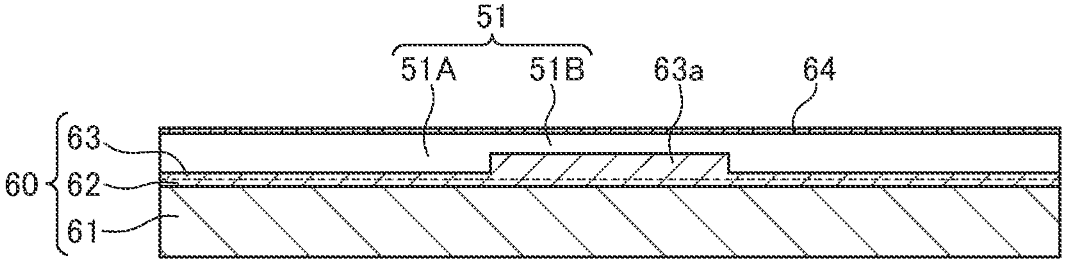
FIG. 5 is a process view for explaining the manufacturing method for the coil component 1.
Figure 6:
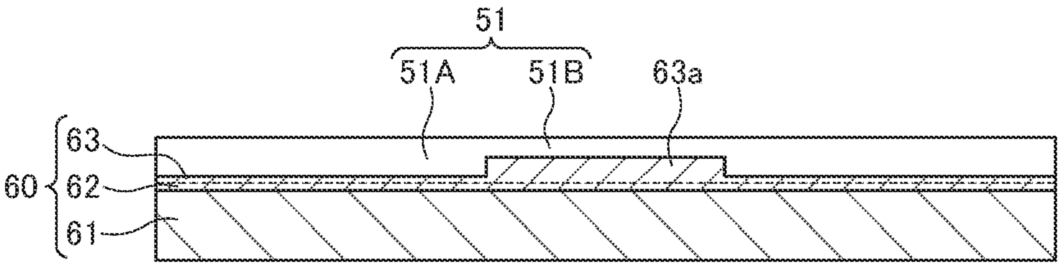
FIG. 6 is a process view for explaining the manufacturing method for the coil component 1.

Then, the interlayer insulating film 51 and a metal foil 64 are formed on the surface of the metal foil 63 having the protruding part 63*a* (FIG. 5). The interlayer insulating film 51 and metal foil 64 can be formed by a laminate method. As a result, the shape of the protruding part 63*a* is transferred to the interlayer insulating film 51, and thus the interlayer insulating film 51 has a large thickness area 51A and a small thickness area 51B.

Figure 7:
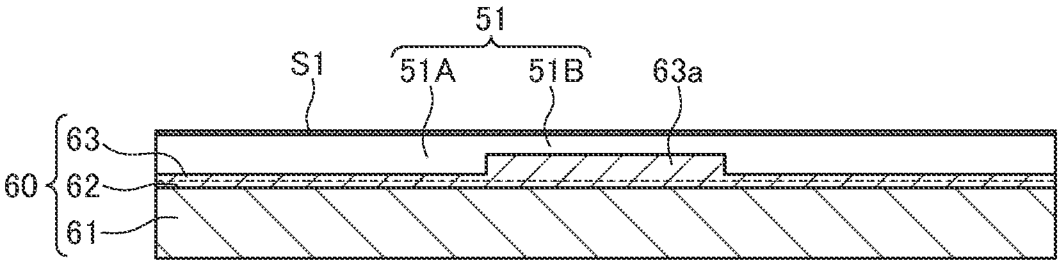
FIG. 7 is a process view for explaining the manufacturing method for the coil component 1.

After removal of the metal foil 64 by etching (FIG. 6), electroless plating is performed to form a seed layer S1 on the surface of the interlayer insulating film 51 (FIG. 7). The metal foil 64 may be used as a seed layer in place of forming the seed layer S1; however, the seed layer S1 is preferably as thin as possible, so that a thinner seed layer S1 is preferably newly formed after removal of the metal foil 64.

Figure 8:
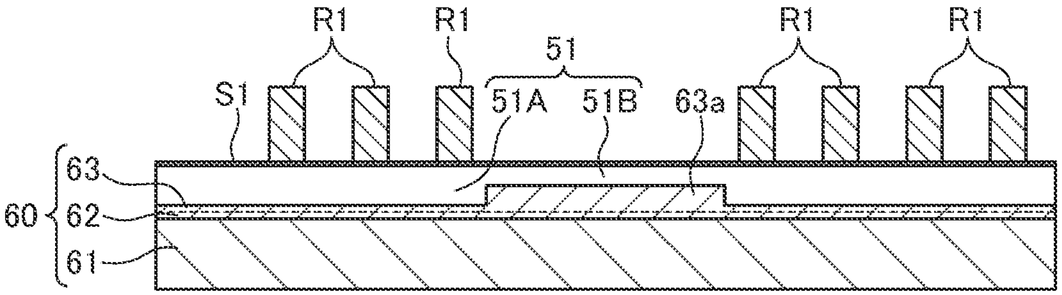
FIG. 8 is a process view for explaining the manufacturing method for the coil component 1.
Figure 9:
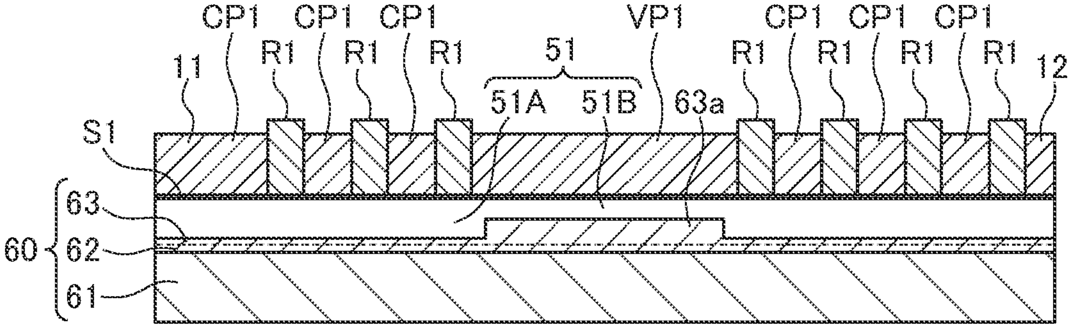
FIG. 9 is a process view for explaining the manufacturing method for the coil component 1.
Figure 10:
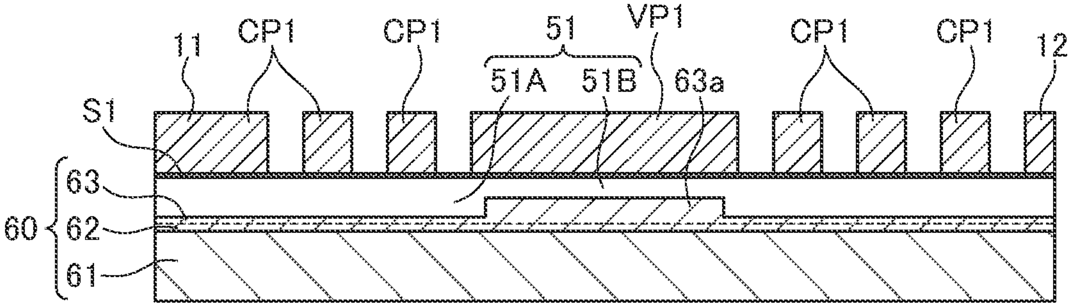
FIG. 10 is a process view for explaining the manufacturing method for the coil component 1.

Then, a resist pattern R1 is formed on the surface of the seed layer S1 (FIG. 8). The resist pattern R1 serves as a negative pattern of the conductor layer 10. In this state, electrolytic plating is performed to grow the seed layer S1 to thereby form the conductor layer 10 (FIG. 9). At this time, a sacrificial pattern VP1 is formed in the inner diameter area of the coil pattern CP1. The position of the resist pattern R1 is adjusted such that the sacrificial pattern VP1 completely overlaps the small thickness area 51A of the interlayer insulating film 51 and partly overlaps the large thickness area 51B.

Figure 11:
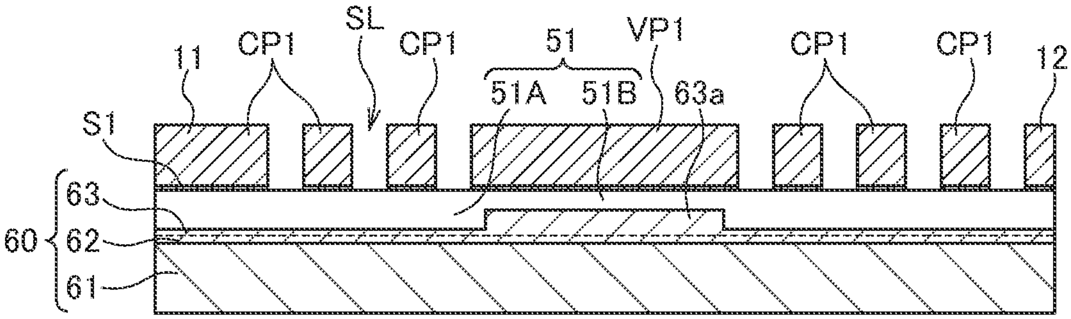
FIG. 11 is a process view for explaining the manufacturing method for the coil component 1.
Figure 12:
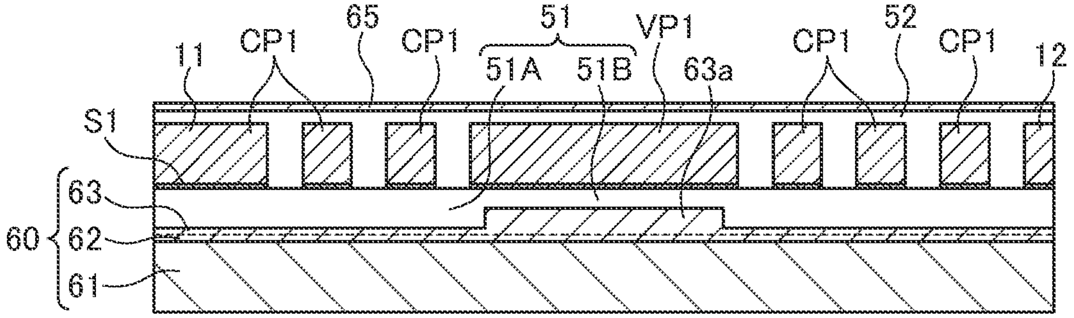
FIG. 12 is a process view for explaining the manufacturing method for the coil component 1.
Figure 13:
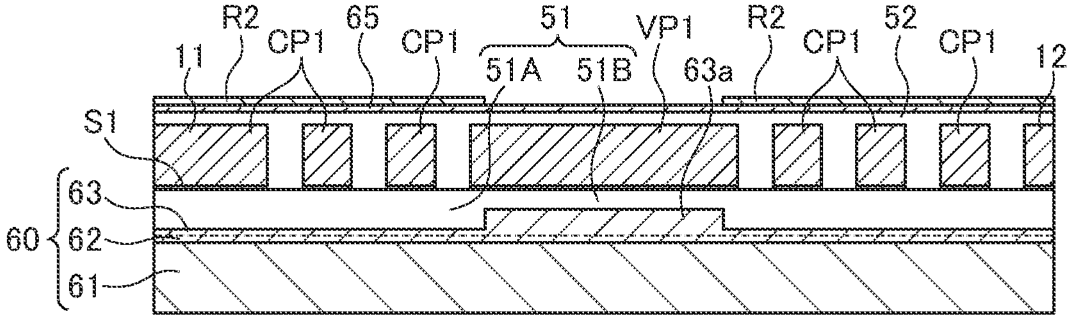
FIG. 13 is a process view for explaining the manufacturing method for the coil component 1.
Figure 14:
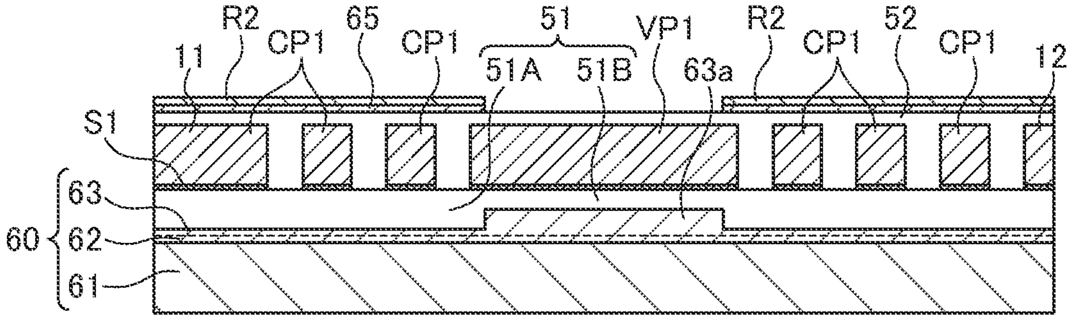
FIG. 14 is a process view for explaining the manufacturing method for the coil component 1.
Figure 15:
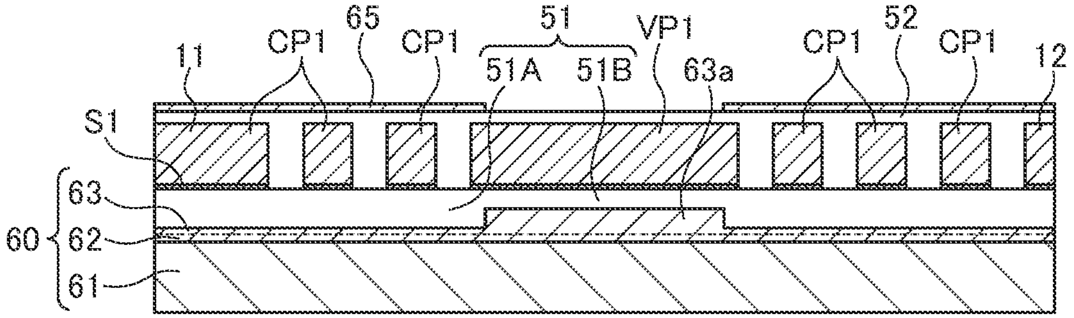
FIG. 15 is a process view for explaining the manufacturing method for the coil component 1.

After peeling of the resist pattern R1 (FIG. 10), a part of the seed layer S1 that is exposed to the peeling portion of the resist pattern R1 is removed by etching (FIG. 11). As a result, the coil pattern CP1 and sacrificial pattern VP1 are electrically isolated by a slit SL. Subsequently, the interlayer insulating film 52 and a metal foil 65 are formed on the surface of the conductor layer 10 so as to fill the slit SL (FIG. 12). The interlayer insulating film 52 and metal foil 65 can be formed by a laminate method. Then, a resist pattern R2 is formed on the surface of the metal foil 65 (FIG. 13), and the metal foil 65 is etched with the resist pattern R2 used as a mask (FIG. 14). As a result, a part of the metal foil 65 that overlaps the sacrificial pattern VP1 is removed.

Figure 16:
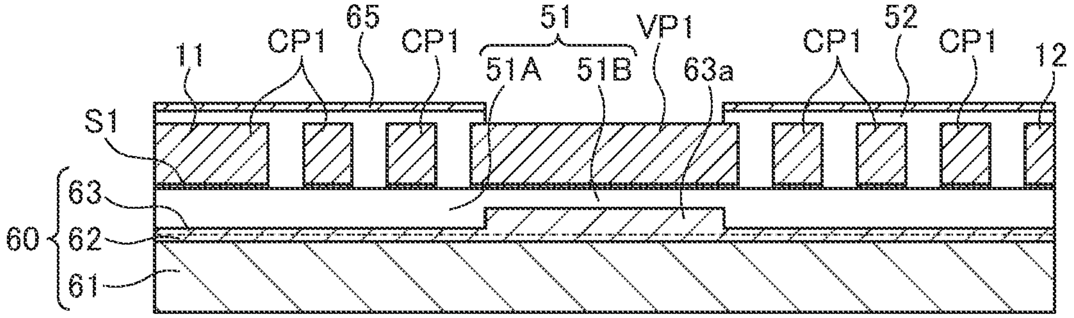
FIG. 16 is a process view for explaining the manufacturing method for the coil component 1.
Figure 17:
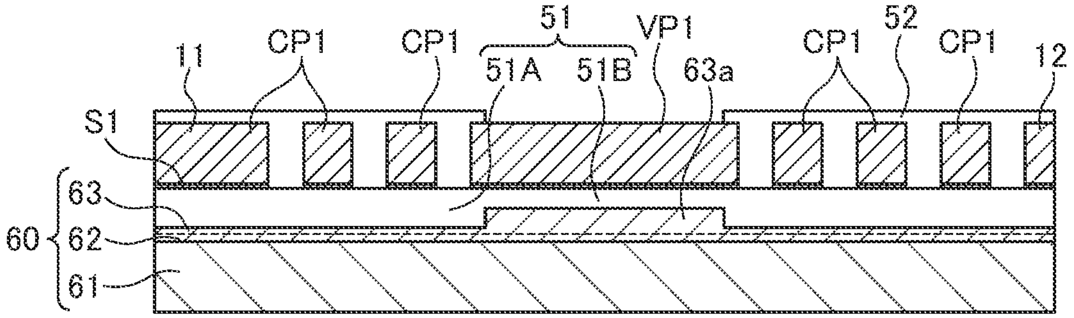
FIG. 17 is a process view for explaining the manufacturing method for the coil component 1.
Figure 18:
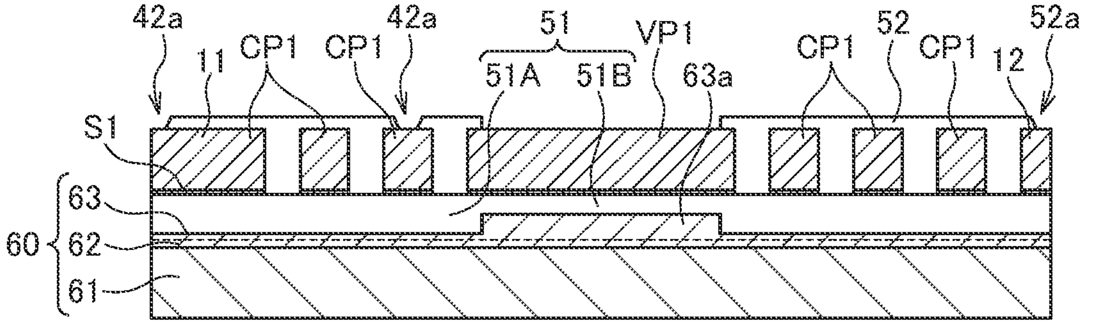
FIG. 18 is a process view for explaining the manufacturing method for the coil component 1.

After peeling of the resist pattern R2 (FIG. 15), blasting is performed with the metal foil 65 used as a mask to expose the sacrificial pattern VP1 (FIG. 16). Then, after removal of the metal foil 65 (FIG. 17), laser machining is performed to form an opening 52*a* in the interlayer insulating film 52 (FIG. 18). Through the above processes, formation of the conductor layer 10 and interlayer insulating film 52 is completed.

Figure 19:
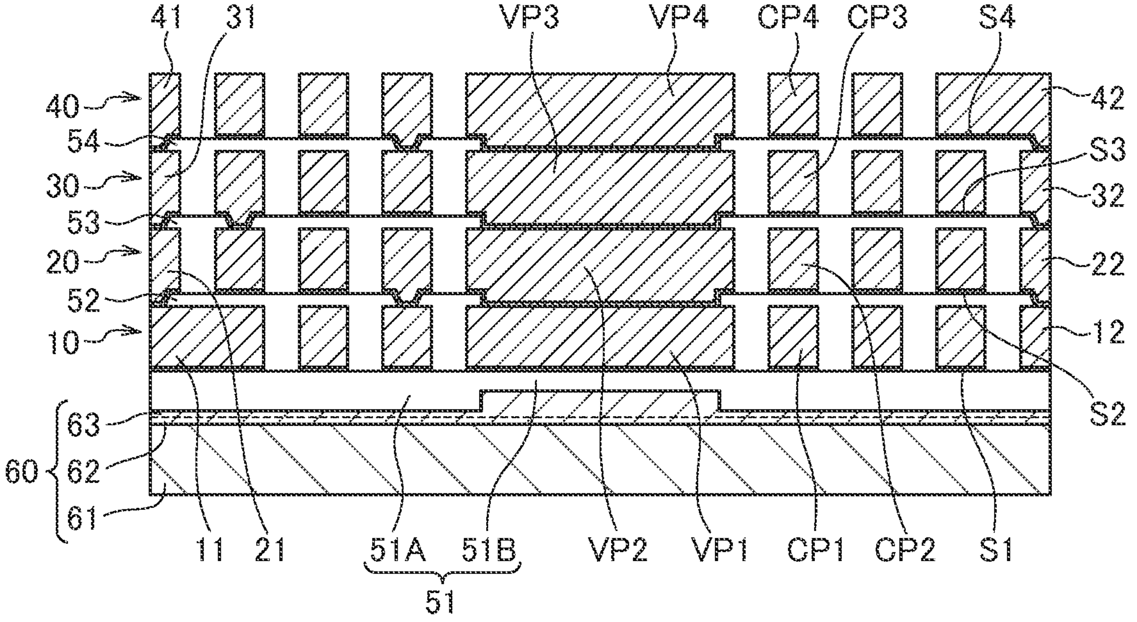
FIG. 19 is a process view for explaining the manufacturing method for the coil component 1.
Figure 20:
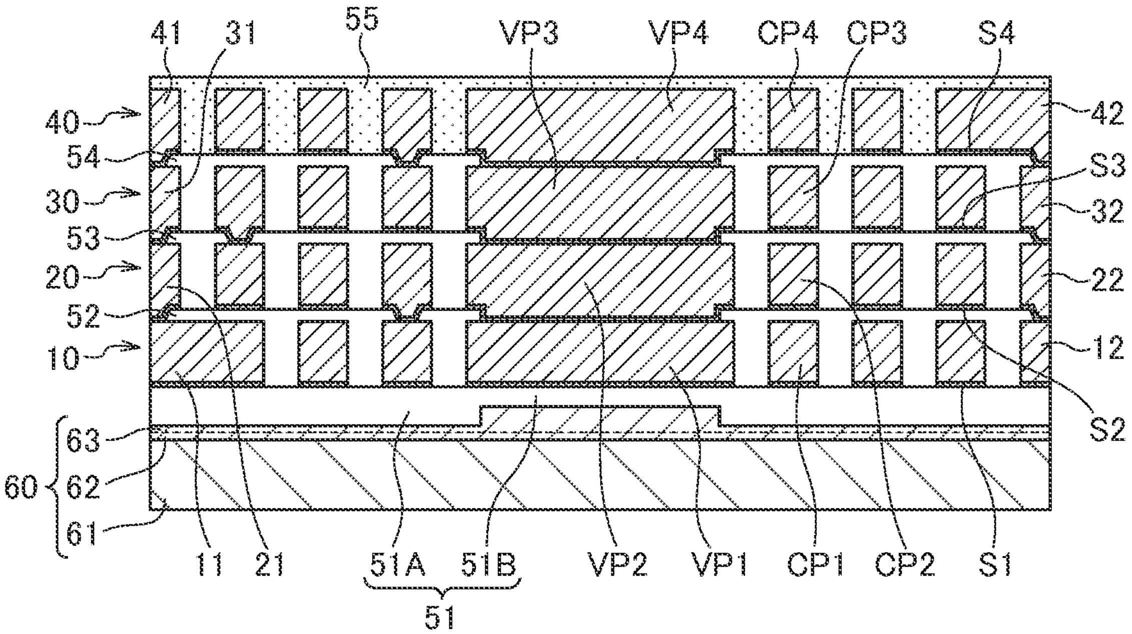
FIG. 20 is a process view for explaining the manufacturing method for the coil component 1.
Figure 21:
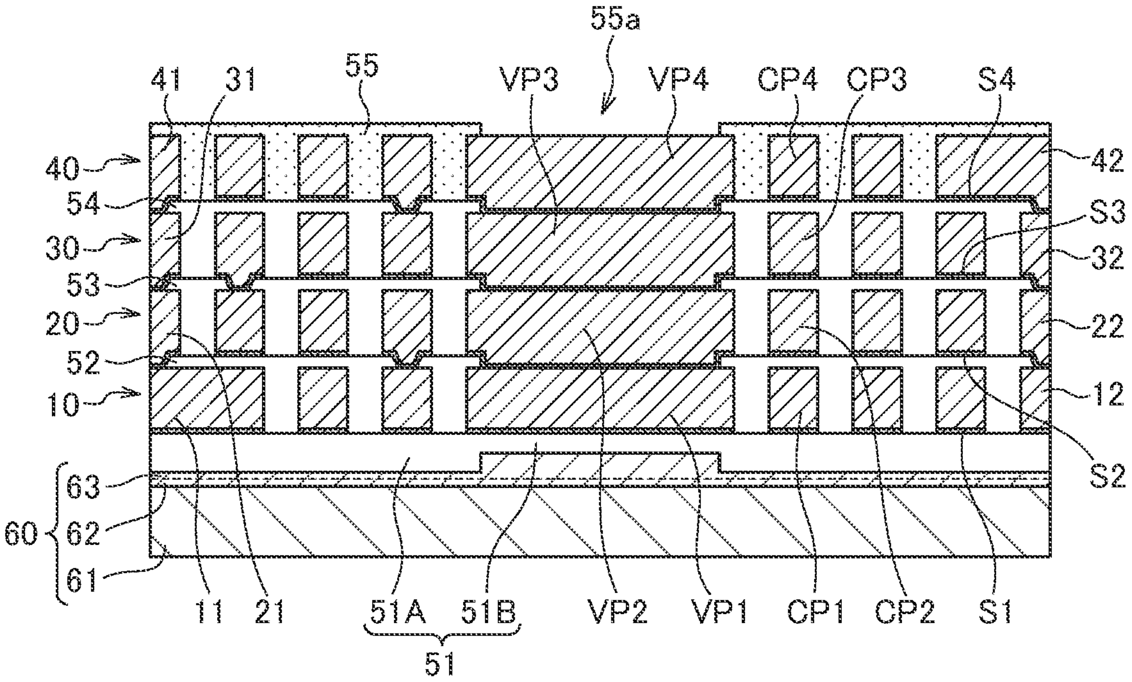
FIG. 21 is a process view for explaining the manufacturing method for the coil component 1.
Figure 22:
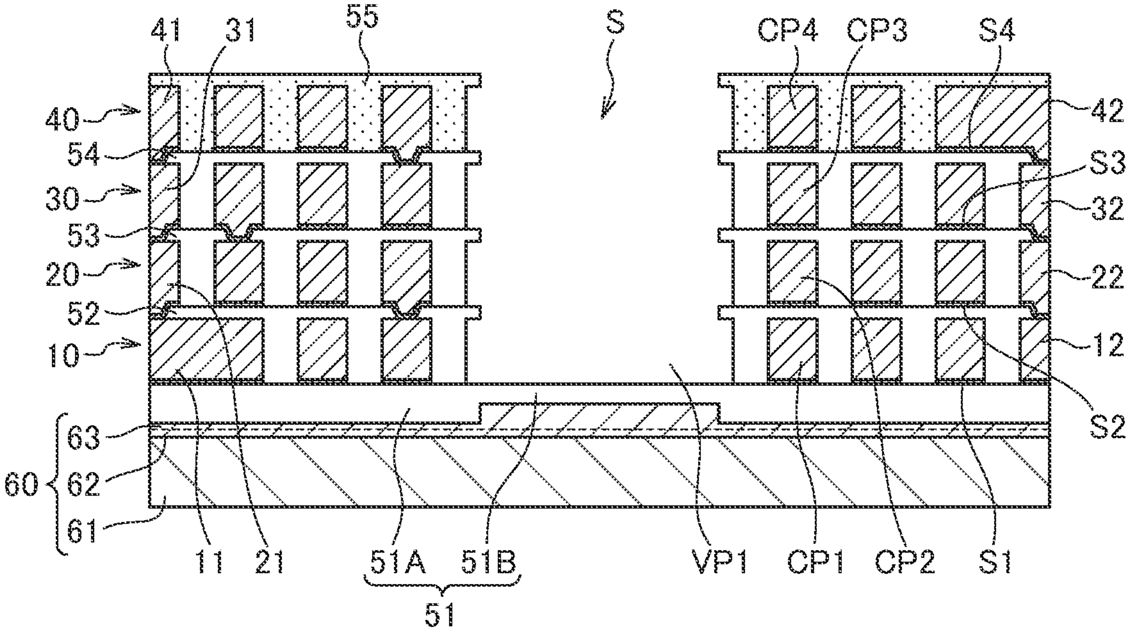
FIG. 22 is a process view for explaining the manufacturing method for the coil component 1.

Thereafter, by repeating the processes illustrated in FIGS. 7 to 18, the conductor layer 20, interlayer insulating film 53, conductor layer 30, and interlayer insulating film 54, and conductor layer 40 are sequentially formed (FIG. 19). The conductor layers 20, 30, and 40 include respectively sacrificial patterns VP2 to VP4 overlapping the sacrificial pattern VP1. Then, the interlayer insulating film 55 that covers the conductor layer 40 is formed (FIG. 20). The interlayer insulating film 55 can be formed by applying a resin material blended with magnetic filler. Then, the interlayer insulating film 55 is patterned to expose the sacrificial pattern VP4 (FIG. 21). In this state, wet-etching is performed to remove the sacrificial patterns VP1 to VP4 (FIG. 22). The coil patterns CP1 to CP4 are covered with the interlayer insulating films 51 to 55 and are thus not etched. As a result, a space S is formed so as to extend over the inner diameter areas of the coil patterns CP1 to CP4.

Figure 23:
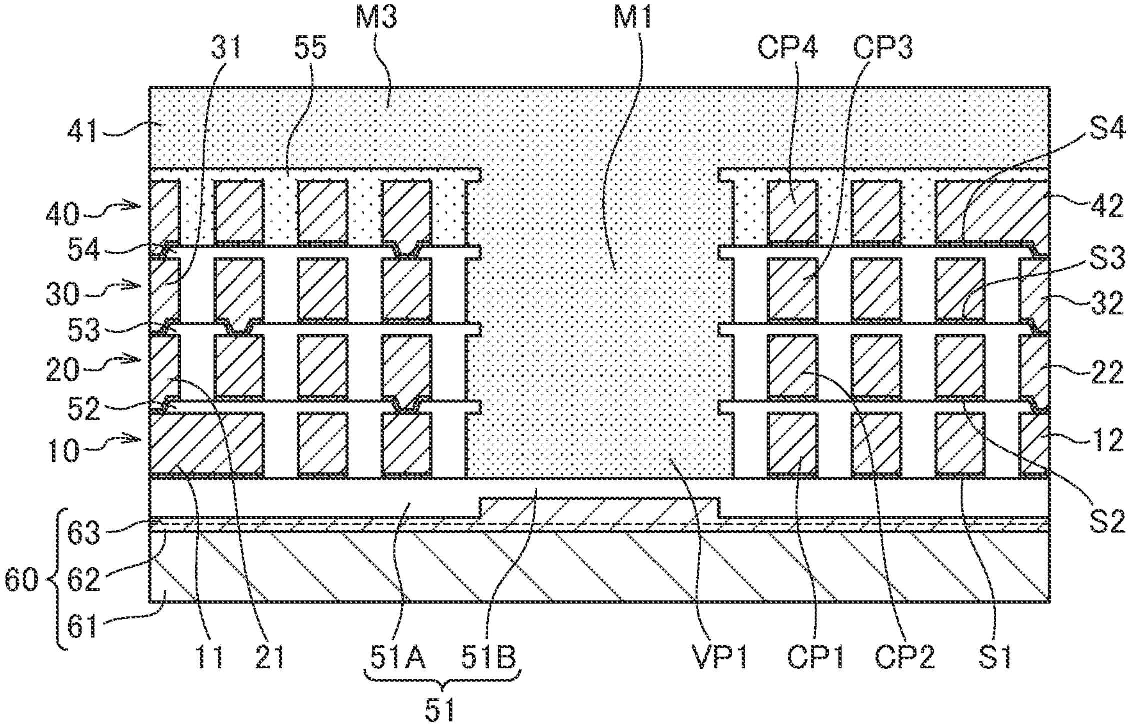
FIG. 23 is a process view for explaining the manufacturing method for the coil component 1.
Figure 24:
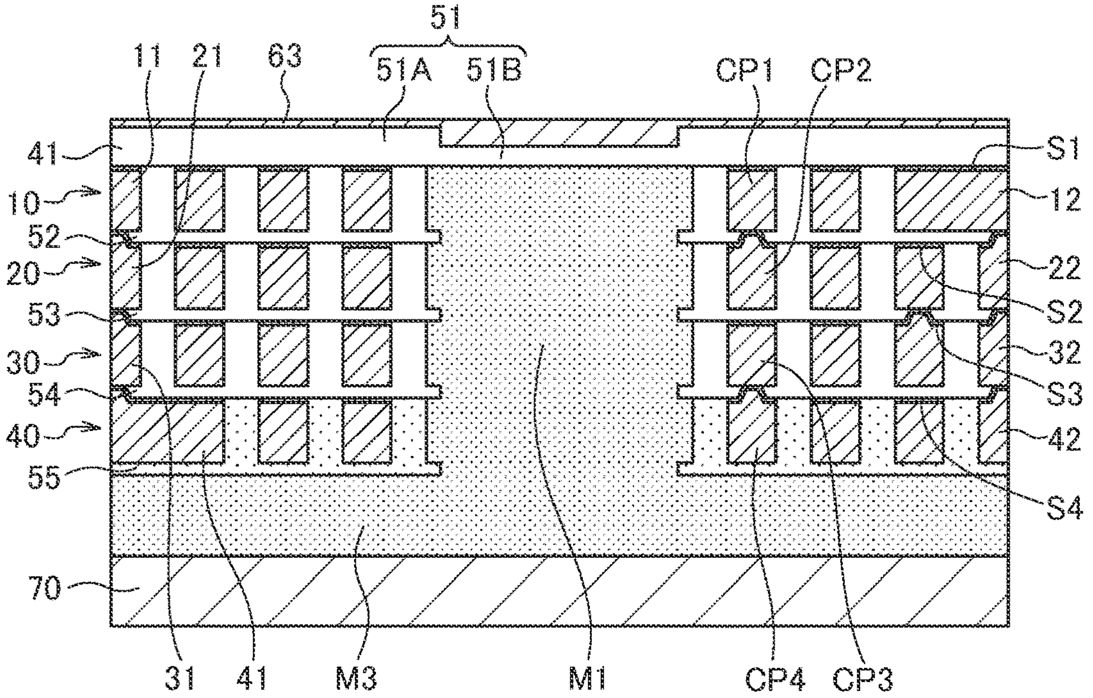
FIG. 24 is a process view for explaining the manufacturing method for the coil component 1.
Figure 25:
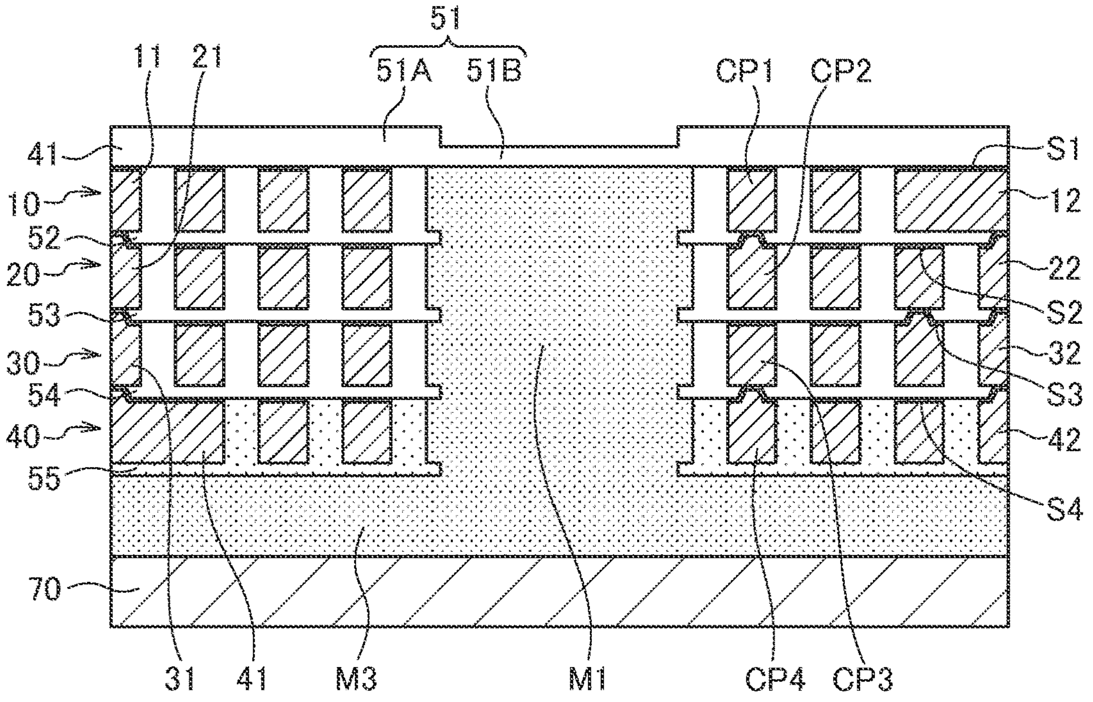
FIG. 25 is a process view for explaining the manufacturing method for the coil component 1.
Figure 26:
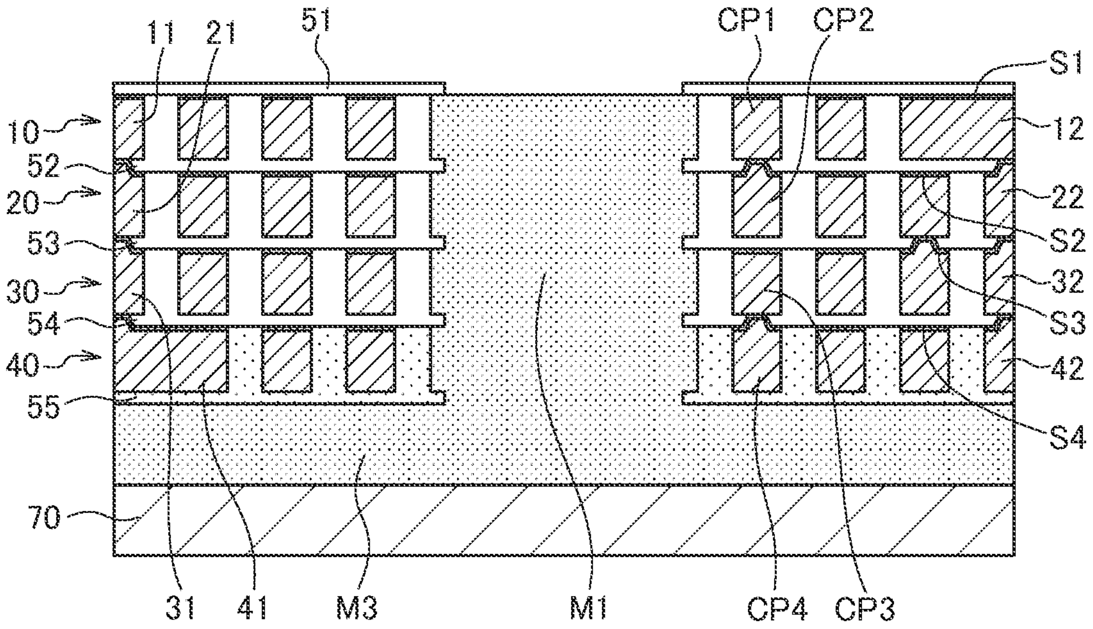
FIG. 26 is a process view for explaining the manufacturing method for the coil component 1.

Then, the magnetic element members M1 and M3 are formed to fill the space S (FIG. 23). Then, the metal foils 62 and 63 are peeled off at the interface therebetween to remove the support 60. Then, after inverting up and down, a support 70 is stuck (FIG. 24), followed by removal of the metal foil 63 by etching (FIG. 25). In this state, aching is performed to reduce the film thickness of the interlayer insulating film 51 as a whole (FIG. 26). The reduction amount of the film thickness is controlled to take such a value that the small thickness area 51B is completely removed, while the large thickness area 51A remains. As a result, the magnetic element member M1 filled in the inner diameter area of the coil part C is exposed.

Figure 27:
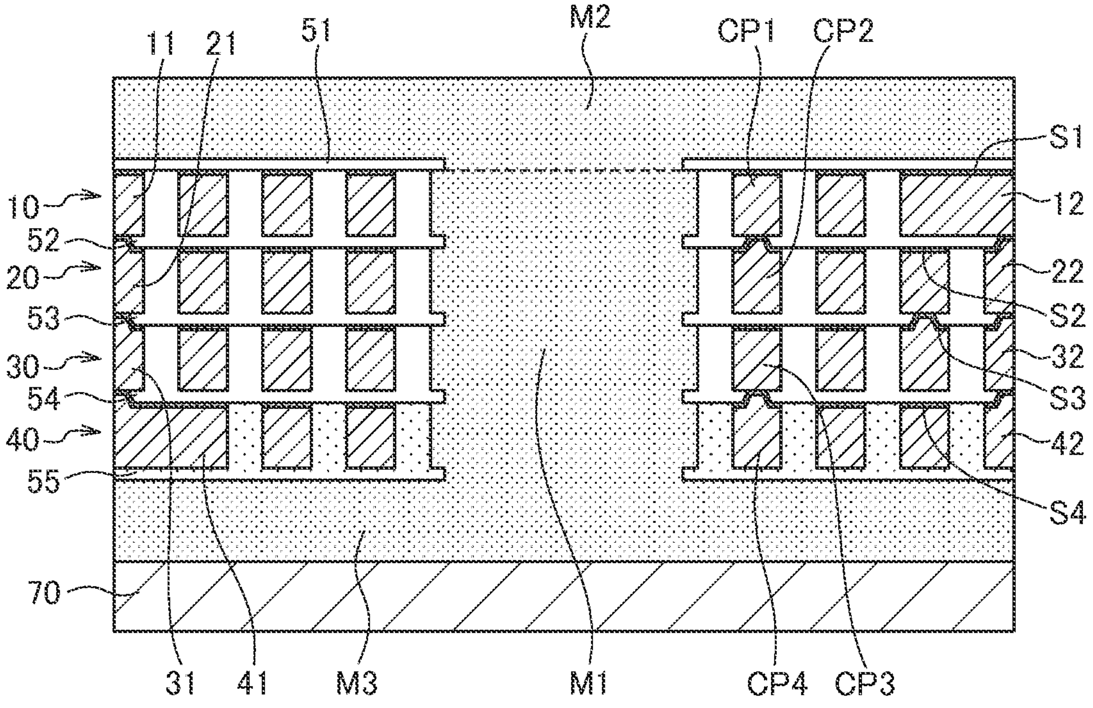
FIG. 27 is a process view for explaining the manufacturing method for the coil component 1.

Then, the magnetic element member M2 is formed so as to cover the interlayer insulating film 51 (FIG. 27). Then, the support 70 is peeled off, and dicing is performed for singulation, whereby the coil component 1 according to the present invention illustrated in FIG. 1 is completed.

As described above, in the present embodiment, the interlayer insulating film 55 is formed by applying a resin material blended with magnetic filler, so that it is possible to achieve a high inductance value without increasing the entire thickness as compared to a case where all the interlayer insulating films 51 to 55 are made of a nonmagnetic material.

Further, in the present embodiment, the interlayer insulating film 51 is laminated on the surface of the metal foil 63 having the protruding part 63*a*, thus allowing the shape of the protruding part 63*a* to be transferred to the interlayer insulating film 51. As a result, the interlayer insulating film 51 has the large thickness area 51A and small thickness area 51B, so that the film thickness thereof can be further reduced by the asking (FIG. 26). This can reduce the height of the coil component 1.

While the preferred embodiment of the present invention has been described, the present invention is not limited to the above embodiment, and various modifications may be made within the scope of the present invention, and all such modifications are included in the present invention.

REFERENCE SIGNS LIST

1 coil component
10, 20, 30, 40 conductor layer
11, 12, 21, 22, 31, 32, 41, 42 electrode pattern
51-55 interlayer insulating film
51A large thickness area
51B small thickness area
51*a* protruding part
52*a* opening
55*a* protruding part
60 support
61 base
62-65 metal foil
63*a* protruding part
70 support
C coil part
CP1-CP4 coil pattern
M1-M3 magnetic element member
R1, R2 resist pattern
S space
S1-S4 seed layer
SL slit
VP1-VP4 sacrificial pattern

What is claimed is:

1. A coil component comprising: a coil part having a structure in which a plurality of interlayer insulating films and a plurality of spirally wound coil patterns are alternately stacked in an axial direction; and a magnetic element member embedding therein the coil part, wherein the plurality of interlayer insulating films include a first interlayer insulating film covering, from one end side in the axial direction, a first coil pattern of the plurality of coil patterns that is positioned at the one end in the axial direction and second interlayer insulating films covering remaining coil patterns of the plurality of coil patterns, wherein the first interlayer insulating film is higher in permeability than the second interlayer insulating films, wherein the magnetic element member is higher in permeability than the first interlayer insulating film, wherein the plurality of interlayer insulating films further includes a third interlayer insulating film covering, from other end side in the axial direction, a second coil pattern of the plurality of coil patterns that are positioned at the other end in the axial direction, and wherein the third interlayer insulating film is higher in permeability than the second interlayer insulating films.

2. The coil component as claimed in claim 1, wherein the first interlayer insulating film is made of a same material as the magnetic element member.

3. The coil component as claimed in claim 1,
wherein the first interlayer insulating film is made of a magnetic resin material obtained by adding magnetic filler to a resin material, and
wherein a maximum particle size of the magnetic filler is smaller than a pattern interval of the first coil pattern.

4. The coil component as claimed in claim 3, wherein the magnetic filler contains nanofiller made of a magnetic metal member having a mean particle size of 1 μm or less.

5. The coil component as claimed in claim 3, wherein the first coil pattern is tapered such that a cross section of the first coil pattern is narrower toward the one end side in the axial direction.

6. The coil component as claimed in claim 1,
wherein the coil part includes an electrode pattern positioned in a same conductor layer as the first coil pattern, and
wherein the electrode pattern contacts the first interlayer insulating film and is exposed from the magnetic element member.

7. A method for manufacturing a coil component, the method comprising:
a first step of alternately stacking a plurality of interlayer insulating films and a plurality of spirally wound coil patterns in an axial direction to form a coil part; and
a second step of embedding the coil part in a magnetic element member,
wherein the plurality of coil patterns includes a first coil pattern to be formed last and remaining second coil patterns, wherein the plurality of interlayer insulating films include first and second interlayer insulating films, wherein the first step includes a step of alternately forming the second coil patterns and the second interlayer insulating films and a step of, after forming the first coil pattern, covering the first coil pattern with the first interlayer insulating film, wherein the first interlayer insulating film is higher in permeability than the second interlayer insulating films,
wherein the magnetic element member is higher in permeability than the first interlayer insulating film, wherein the plurality of interlayer insulating films further includes a third interlayer insulating film covering, from other end side in the axial direction, a second coil pattern of the plurality of coil patterns that are positioned at the other end in the axial direction, and wherein the third interlayer insulating film is higher in permeability than the second interlayer insulating films.

* * * * *